Patented Oct. 22, 1929

1,732,700

UNITED STATES PATENT OFFICE

LUTHER A. SOMMER AND FRANK H. ADAMS, OF CLEVELAND HEIGHTS, OHIO, ASSIGNORS TO THE CLEVELAND HOBBING MACHINE COMPANY, OF CLEVELAND, OHIO, A CORPORATION OF OHIO

MULTIPLE-SPINDLE MACHINE TOOL

Application filed October 12, 1925. Serial No. 61,871.

The present invention relates to a machine tool, and particularly to a multiple spindle machine in which a series of machining units are mounted to travel in an endless path, moving past the operator's station where finished articles are removed and blanks to be machined are inserted, the individual units being so operated and controlled during their travel in said endless path that the operation on each blank is completed during the travel of the unit from and to the operator's station.

The present invention has for an object to reduce manufacturing cost by providing a single continuously operating machine requiring a single operator only, and simultaneously acting upon a number of blanks, the multiple machine being capable of doing the work of several ordinary single spindle machines.

A further object is to economize factory floor space by mounting a series of milling machines upon a single base occupying little more space than a single machine of the same character as heretofore constructed.

A further object is to provide a continuously operating machine capable of simultaneously hobbing a number of blanks.

The following description and accompanying drawings set forth in detail certain means embodying the invention, the disclosed means, however, constituting but one of the various mechanical forms in which the principle of the invention may be employed.

Figure 1:
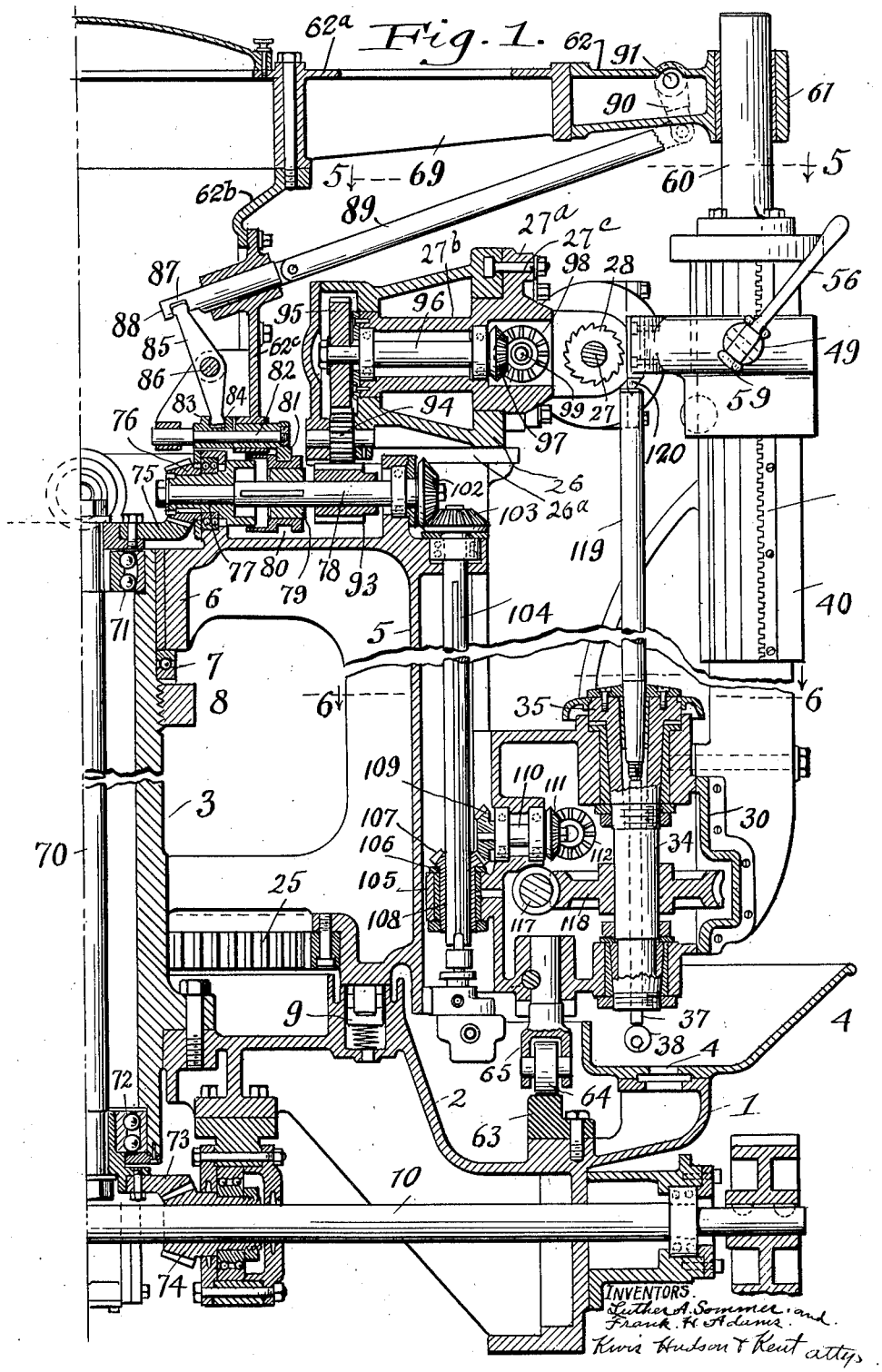
Figure 2:
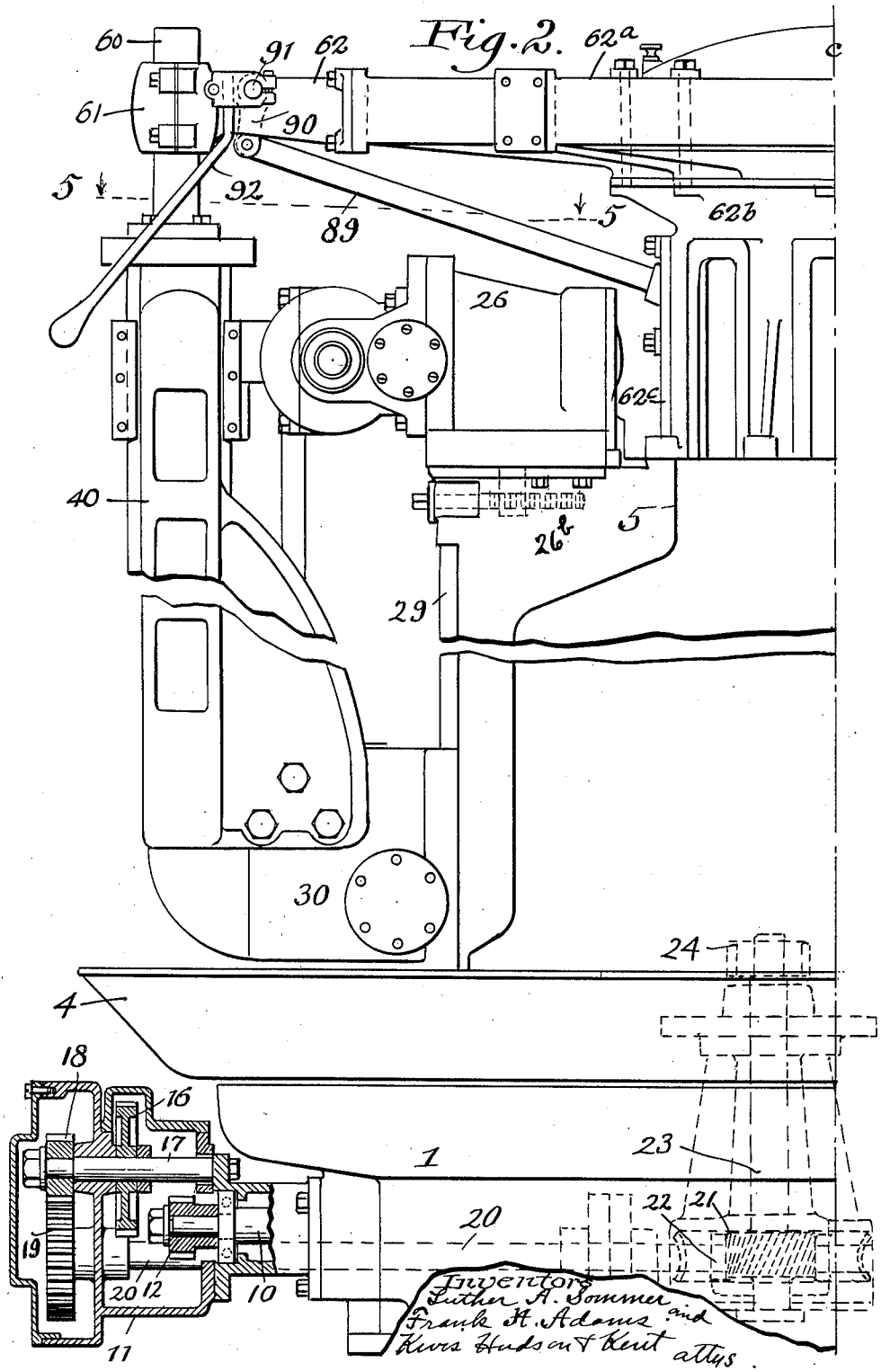
Figure 3:
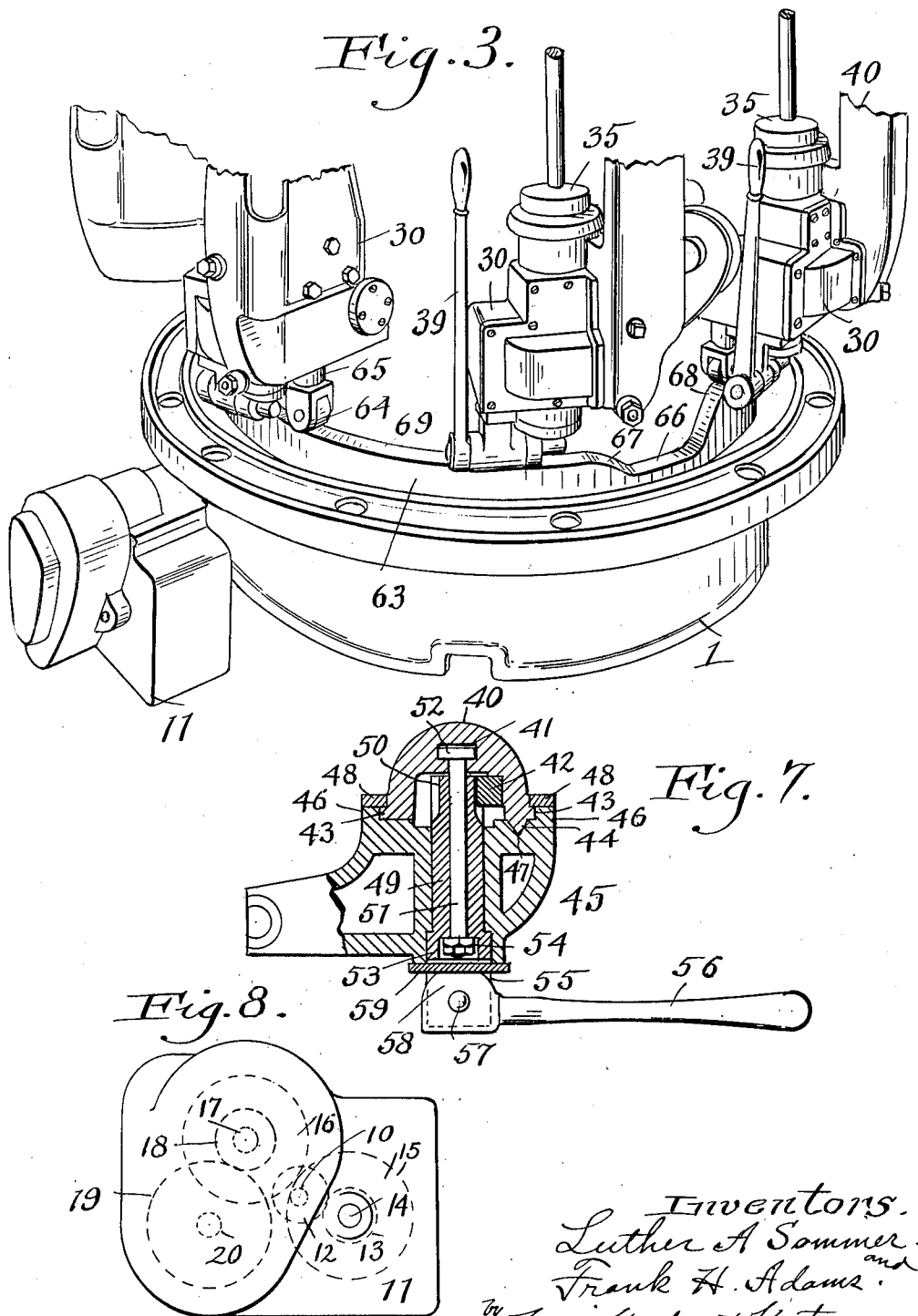
Figure 4:
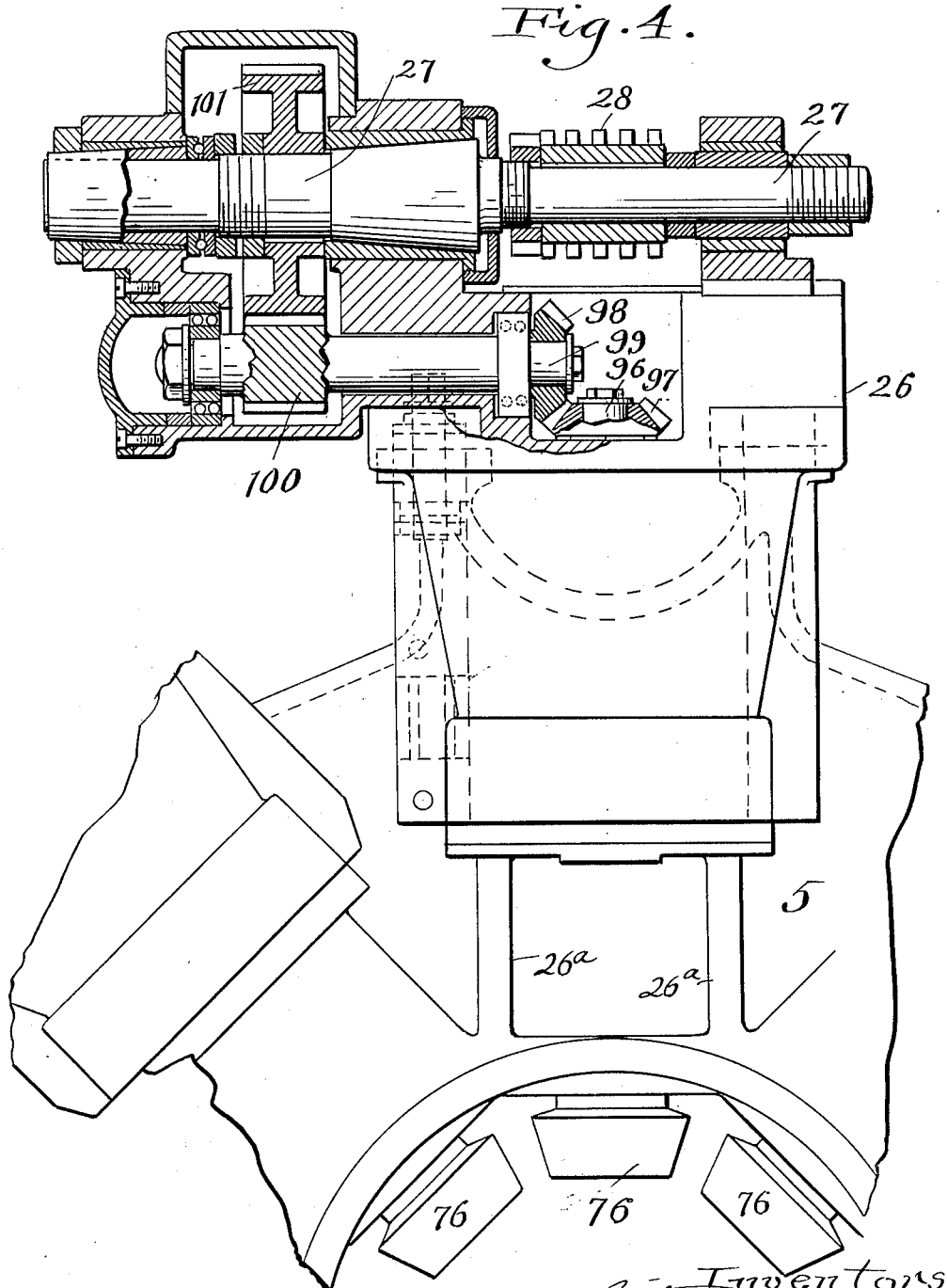
Figure 5:
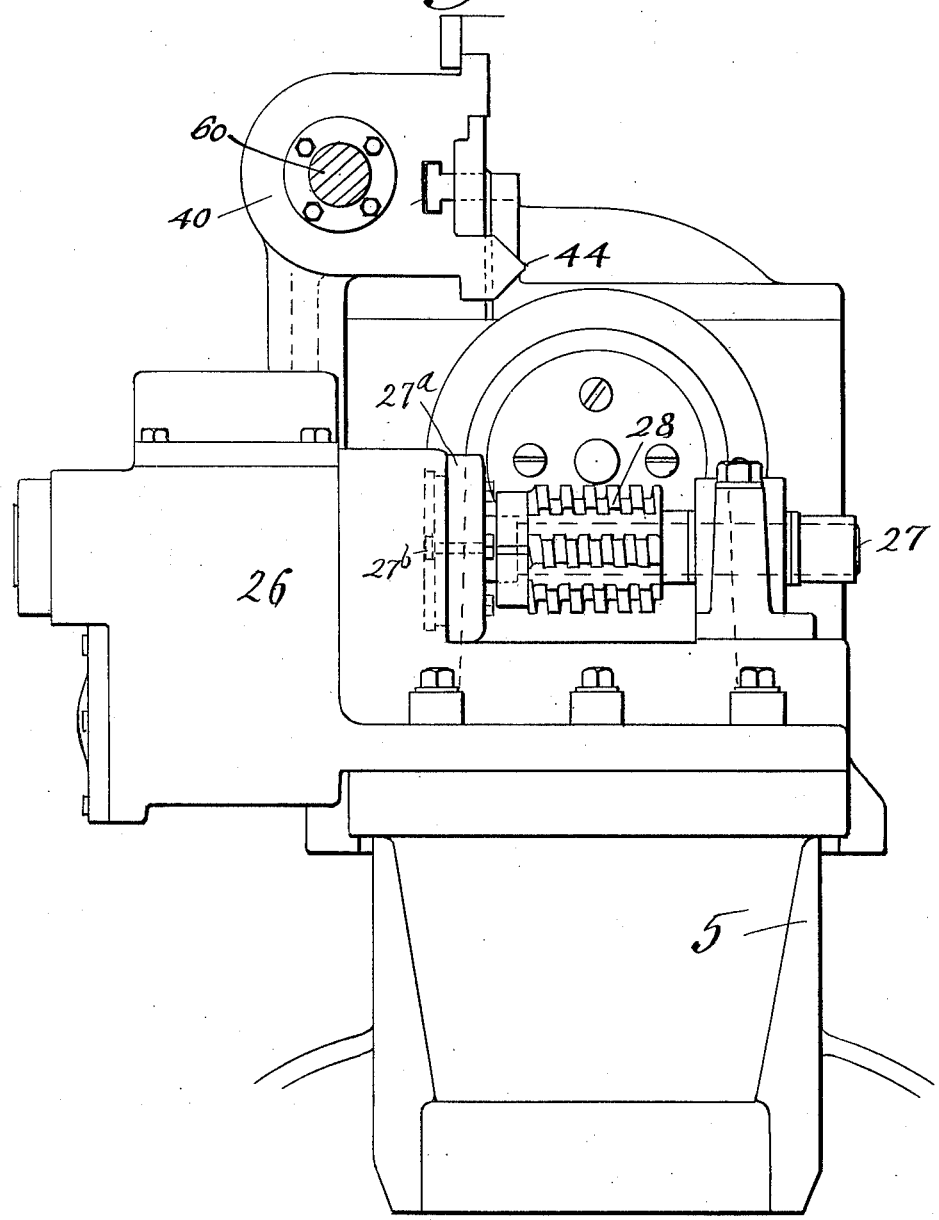
Figure 6:
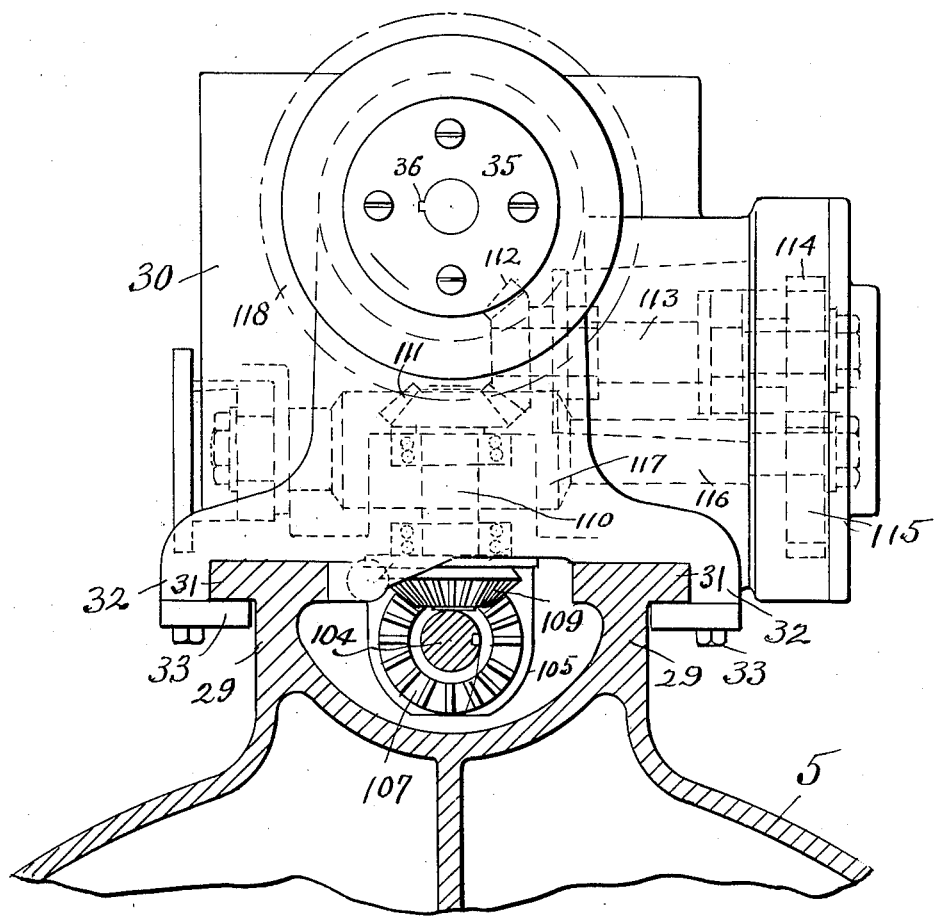

Reference should be had to the accompanying drawings forming a part of this specification, in which Fig. 1 is an axial section from the center to the outer circumference of the machine, the section being taken centrally through one of the hobbing units. Fig. 2 is a front elevation showing one half of the machine, and partially broken away to show the reduction gear case at one side of the base in section. Fig. 3 is a perspective view showing the bottom portion of the rotary turret and the fixed base with the drip trough removed to show the cam track; Fig. 4 is a fragmentary top plan view partly in section showing the cutter head and a portion of the gearing for driving the hob. Fig. 5 is a section on line 5—5 of Fig. 1 looking in the direction indicated by the arrows, with the tailstock removed. Fig. 6 is a horizontal section taken on line 6—6 of Fig. 1, looking in the direction indicated by the arrows; Fig. 7 is a sectional detail view showing the tailstock adjusting device; Fig. 8 is a side elevation of the reduction gear case.

In the accompanying drawings, the invention is shown applied to a multiple spindle hobbing machine in which a series of separate hobbing units are carried by a rotary turret mounted upon a fixed base. The entire mechanism is mounted upon a fixed circular base 1 which has a solid bottom forming a drip pan 2 to catch the lubricant dripping from the cutter.

Rigidly secured to the base 1 at the center thereof is a vertical hollow post 3, and at the periphery of the base there is mounted an annular drip trough 4 which has openings $4^a$ in the bottom thereof to permit lubricant to drain down into the pan 2.

A rotary turret 5 is mounted upon the post 3 and has a central bearing sleeve 6 which fits upon the top of the post and is supported by a thrust bearing 7 which is adjustably supported on the post 3 by an adjusting nut 8.

Outwardly from the central post 3 the turret 5 slides upon a lubricating bearing 9 carried by the base 1.

The drive shaft 10 driven from any suitable source of power extends through the base 1 and into a gear case 11 at one side of the base. Within the gear case 11 there is a speed reducing gear train consisting of a gear 12 on the shaft 10 which meshes with the gear 13 on a counter shaft 14, the counter shaft having fixed thereto a large gear 15 which meshes with a large gear 16 on a second counter shaft 17, the counter shaft 17 having a small gear 18 fixed thereto which meshes with a large gear 19 on a shaft 20 which extends into the base parallel with the shaft 10.

The shaft 20 is driven at a lower rate of speed than the main driving shaft 10 and operates gearing for rotating the turret 5. The shaft 20 carries a worm 21 which meshes with a worm gear 22 on a vertical shaft 23 which has a pinion 24 at the upper end meshing with a large internal gear 25 fixed to the turret.

Upon the upper portion of the turret a series of, regularly spaced radially adjustable cutter heads 26 are mounted, each head having mounted therein a transversely disposed angularly adjustable cutter spindle 27 to which is attached a hobbing cutter 28. Each head 26 is slidably mounted on a radially disposed guideway 26$^a$ on the turret and may be adjusted inwardly or outwardly along the guideway by means of a lead screw 26$^b$ (Fig. 2). Each cutter spindle 27 is mounted in an auxiliary head 27$^a$ which has a tubular extension 27$^b$ extending radially into the head 26 and rotatable therein, the auxiliary head 27$^a$ being held in adjusted position by a bolt 27$^c$ extending through the head 27$^a$ and having its head within an arcuate groove in the head 26.

As best shown in Fig. 6 of the drawing, the body of the turret is provided with a pair of vertical guide ribs 29 beneath each cutter head 26, and upon each pair of guide ribs 29 there is slidably mounted a vertically movable work holding head 30. For retaining the work holding head 30 upon the guide ribs each rib has a lateral extension 31 along its outer edge, and the heads are provided with extensions 32 which overlie the edges of the oppositely extending portions 31 of the ribs, the head being held in place by gibs 33 secured to the extensions 32 of the head and overlying the extensions 31 of the guide ribs 29.

Each work holding head has a vertical spindle 34 journalled in suitable bearings in the upper and lower portions thereof, and each spindle 34 has a tapered socket chuck 35 at its upper end adapted to receive the blank to be hobbed. Suitable means is provided for holding the blank against rotation in the chuck, the chuck as shown herein being provided with a face plate 36 having a notch adapted to receive a key on the blank.

Each spindle 34 is preferably hollow and has a kick-out pin 37 slidably mounted therein and extending from the lower end of the chuck socket to the lower end of the spindle, the lower end of the kick-out pin being supported upon a cam 38 which may be turned by means of a lever 39 rigidly secured thereto to raise the pin 37 and free a blank from the chuck.

Each head 30 has a vertical post 40 rigidly secured to the outer side thereof and each post 40 is in the form of a laterally facing channel having a T-shaped slot 41 formed along the bottom of the channel.

A rack bar 42 is secured within the channel of each post 40 against one of the side flanges thereof, and each of the flanges of the post has a laterally projecting rib 43, one of the flanges being provided with a tapered edge 44. A tailstock 45 is slidably mounted upon each of the posts 40 on the side thereof toward which the channel faces, each tailstock having ribs 46 overlying the edges of the ribs 43 of the post, and being provided with a vertical tapered groove 47 to receive the tapered edge 44 of the post.

The tailstock is retained on the post by means of gibs 48 secured to the ribs 46 of the tailstock, and overlying the inner sides of the ribs 43 of the post.

A horizontal hollow shaft 49 extends through the tailstock 45 into the channel of the post 40 and has its inner end milled to provide a gear 50 which meshes with the rack 42 within the channel of the post. A bolt 51 is mounted within the hollow shaft 49 and extends beyond the inner end thereof having a T-head 52 which slides in the T-groove 41 in the post 40. The outer end of the shaft 49 has a counter bore 53 in which the outer end of the bolt 51 lies, and the bolt 51 is secured to the shaft by means of nuts 54 on the end thereof within the counter bore 53.

The hollow shaft 49 projects beyond the outer face of the tailstock 45, the projecting end being provided with a transverse slot 55 within which a lever 56 is pivotally connected to the shaft by a transverse pivot pin 57. The inner end of the lever 56 has a cam 58 formed thereon which acts against a bearing plate 59 which rests upon the outer face of the tailstock and extends through the slot 55 of the shaft.

When the lever 56 is in the position at right angles to the shaft 49 as shown in Fig. 7, it may be used as a crank to turn the shaft 49 and through the rack 42 and pinion 50 to shift the tailstock up or down upon the post 40.

When the lever 56 is swung outwardly from the position shown in Fig. 7, the cam 58 engages the plate 59 and pulls the shaft 49 outwardly and with it the bolt 51, causing the tailstock to be pressed tightly against the post 40 so that it will be rigidly held in the position to which it has been adjusted.

At its upper end each post 40 has a cylindrical extension 60 rigidly attached thereto which slides in a guide sleeve 61 on the outer end of a radial arm 62 carried by the turret. The radial arms 62 carrying the guide sleeves are, in this instance, secured to and form continuations of radial arms of a spider 62$^a$ secured to the top of an upright hollow casting 62$^b$ in turn secured to the top of the turret 5 (see Figs. 1 and 2). This forms an overhead support for the upstanding work supporting arms 40 and steadies them so as to minimize chatter during the cutting operation. The arms 62, spider 62$^a$ and casting 62$^b$, in effect form a part of the turret 5.

The vertically movable work holders are supported upon an annular cam track 63 carried by the base 1, each head 30 being supported by a roller 64 which travels along the track 63 and is carried by a vertical forked post 65 which is rigidly mounted in the bottom of the head.

The cam track 63 has a depressed portion 66 with shoulder portions 67 and 68 at the opposite ends thereof leading to elevated portions of the track, the portion 69 of the track extending throughout the major portion of the circumference of the track being inclined uniformly from the shorter inclined shoulder 67, to the higher inclined shoulder 68.

In the operation of the machine each work holder is lowered sufficiently while passing along the depressed portion 66 of the track to free the blank from the cutter, and to permit the finished blank to be removed and a new blank to be inserted. As the roller 64 supporting each work holder moves up the incline 67 the blank is brought into engagement with the cutter and as the work holder travels along the gradually inclined portion 69 of the track, the blank is fed to the cutter.

Both the cutter and work spindles are driven from the drive shaft 10 through gearing mounted upon the turret, the drive being effected through a vertical shaft 70 journalled in upper and lower bearings 71 and 72 within the central hollow post 3, and at the axis of the turret. The shaft 70 has a bevel gear 73 at the lower end thereof which meshes with a bevel gear 74 fixed to the shaft 10 at the upper end thereof and the shaft 70 has fixed thereto a large bevel gear 75 which meshes with a series of bevel gears 76 which are carried by sleeves 77 rotatably mounted on radial shafts 78, there being one radial shaft 78 for each of the hobbing units.

The outer end of the sleeve 77 is formed to provide a clutch element which co-operates with a slidable clutch element 79 keyed to the shaft 78. The slidable clutch element 79 on each of the radial shafts 78 is provided with a circumferential groove 80 which receives a downwardly extending projection 81 carried by a radially disposed horizontal pin 82 which is slidably mounted in the wall of the turret above the shaft 78. The pin 82 has attached thereto a collar 83 provided on its upper side with a transverse groove 84 which receives the lower end of a lever 85 mounted to swing about a horizontal pivot 86. The upper end of the lever 85 extends into a transverse slot 87 in the inner end of a sliding pin 88 which is inclined in an upward direction and is slidably mounted in the wall of the turret. Preferably the slidable pins 82 and 88 are mounted in a plate or panel 62ᶜ, (Fig. 1) attached to the side wall of the hollow casting 62ᵇ which, as before stated, forms a part of the turret, one of these plates or panels being provided for each hobbing unit or mechanism.

To the outer end of the pin 88 there is connected a link 89 which is connected at its outer end to a crank arm 90 fixed to a shaft 91 journalled in the arm 62 upon the inner side of the guide sleeve 61 near the outer end thereof.

Rigidly attached to the shaft 91 is a lever 92 which projects outwardly past the post 40 and is adapted to be operated to shift the clutch element 79 into or out of engagement with the sleeve 77 so that each of the radial shafts 78 may be driven or may be freed from the driving shaft, independently of the others.

Both the rotary cutter and the rotating work spindle of each unit are driven from a radial shaft 78, and any one of the hobbing machines or units can be stopped at any time by operating the lever 92.

For driving the cutters each shaft 78 has an elongated spur gear 93 fixed thereto which is in sliding mesh with an idler 94 carried by the radially adjustable head 26 which in turn meshes with a gear 95 on a second radial shaft 96 above the shaft 78 driving the same, the shaft 96 being journalled within the tubular sleeve 27ᵇ forming the radial pivot of the auxiliary outer head 27ᵃ. At its outer end each shaft 96 has a bevel gear 97 which meshes with a bevel gear 98 on a horizontally disposed shaft 99 at right angles to the shaft 96 and carried by the auxiliary cutter carrying head 27ᵃ which is angularly adjustable about the axis of the shaft 96. As best shown in Fig. 4 the shaft 99 has fixed thereto a gear 100 which meshes with a gear 101 on the cutter spindle 27.

At the outer end of each radial shaft 78 there is a bevel gear 102 which meshes with a bevel gear 103 fixed to the upper end of a vertical shaft 104 journalled in the outer portion of the turret body and positioned in the channel between the vertical guide flanges 29 of the turret. Each head 30 has a guide arm 105 extending into the channel between the ribs 29 upon which the head is mounted, and this guide arm has a vertical opening therethrough in which is mounted a bearing sleeve 106 surrounding the shaft 104. Slidably keyed on the shaft 104 is a bevel gear 107 which has an integral sleeve 108 journalled in the bearing sleeve 106. The gear 107 is thus mounted to move vertically with the head 30 and meshes with a bevel gear 109 fixed to the inner end of a short shaft 110 journalled in the inner wall of the head 30.

As best shown in Fig. 6, the shaft 110 has a bevel gear 111 at the outer end thereof, which meshes with a bevel gear 112 on a counter shaft 113 extending at right angles to the shaft 110. The counter shaft 113 has fixed thereto a gear 114 which meshes with a gear 115 on a shaft 116 extending parallel with the shaft 113 and below the same. The shaft 116 carries a worm 117 which meshes with a worm gear 118 fixed to the work spindle 34.

In the operation of the machine an operator standing alongside the depressed portion 66 of the cam track will insert work pieces 119, which as shown herein, are axle drive shafts, into the work holding chuck at the upper end of the spindle. The operator will then shift the lever 56 to a position at right angles to the shaft 49 and will turn the shaft to bring the tailstock center 120 into engagement with the upper end of the blank 119, whereupon the lever 56 will be shifted outwardly to lock the tailstock in place. The operator will then shift the lever 92 to engage the clutch element 79 and drive the shaft 78, and from the shaft 78 the cutter and work holder through the gear above described. As the roller 64 supporting the unit moves up the incline 67 of the track the upper end of the rotating blank 119 will be brought into engagement with the rotating hob and as the unit passes over the uniformly inclined portion 69 of the track the blank will be gradually fed to the hob. The blank will be placed in the work holders of the successive units as these units pass the depressed portion 66, and the blank in the units traveling along the incline 69 of the cam will be operated upon simultaneously. By the time a unit carrying a blank being operated upon reaches the high end 68 of the incline 69, the hobbing operation will have been completed, and as the roller 64 travels down into the depression 66, the blank will be lowered away from the cutter. The operator will then shift the lever 92 to stop the cutter and work spindle, whereupon he will shift the tailstock by means of the lever 56, release the work from the chuck 35 by means of the lever 39, remove the finished work piece, and insert a blank in the manner above described.

We aim in our claims to cover all modifications which do not involve a departure from the spirit and scope of the invention as set forth in the appended claims.

Having described our invention, what we claim is:

1. A multiple spindle hobbing machine, comprising a series of hobbing machines, each having a hobbing cutter and a rotary blank holder, means for moving said machines bodily in an endless path, means for driving said cutters and work holders, means for causing a relative feed movement between the cutters and blanks during the travel thereof, and separate means for controlling the driving means for each cutter and its associated work holder.

2. In a machine of the character described, a rotary turret, means for rotating the turret, a plurality of milling machines on the turret, each comprising a rotary work holder and a rotary cutter associated with each work holder, means operating automatically during rotation of the turret to cause a relative feed movement between each work holder and associated cutter, a drive shaft at the axis of the turret and means for driving the cutter and work holders from said drive shaft.

3. In a machine of the character described, a rotary turret, means for rotating the turret, a plurality of milling machines on the turret, each comprising a rotary work holder and a rotary cutter associated with each work holder, means operating automatically during rotation of the turret to cause a relative feed movement between each work holder and associated cutter, and independently controlled means for driving each cutter and work holder.

4. In a machine of the character described, a fixed base member, a turret rotatably mounted on said base member, a plurality of rotary work holders carried by the turret, cutters mounted on the turret, one associated with each work holder, means operating automatically during rotation of the turret to cause a relative feed movement between each work holder and its associated cutter, a drive shaft at the axis of the turret, and means for driving the work holders from said shaft.

5. In a machine of the character described, a fixed base member, a turret rotatably mounted on said base member, a plurality of rotary work holders carried by the turret, cutters mounted on the turret, one associated with each work holder, means operating automatically during rotation of the turret to cause a relative feed movement between each work holder and its associated cutter, a drive shaft at the axis of the turret, means for driving the work holders from said shaft, and independent means for controlling the operation of each of said work holders.

6. In a machine of the character described, a fixed base member, a turret rotatably mounted on said base member, a plurality of rotary work holders carried by the turret, cutters mounted on the turret, one associated with each work holder, means operating automatically during rotation of the turret to cause a relative feed movement between each work holder and its associated cutter, driving means for said turret and said work holders, and means for controlling the operation of each of the work holders.

7. In a machine of the character described, a fixed base member, a rotary turret mounted on the base member, a cam track on said base member, heads mounted for vertical movement on the turret and supported on said cam track, rotary work holders carried by said heads, a shaft at the axis of the turret, means for driving said shaft, means for driving said work holders from said shaft, and a cutter mounted on the turret adjacent each work holder.

8. In a machine of the character described, a turret, a series of circumferentially spaced rotatable work holders on the turret, a rotatable cutter associated with each work holder, a shaft at the axis of the turret, means for rotating the turret, means for driving said shaft, a series of radially disposed shafts carried by the turret, means for driving said radial shafts from the axial shaft, means for driving a work holder and the cutter associated therewith from each of said radial shafts, and means for automatically causing a relative feed movement between the work holder and cutter during rotation of the turret.

9. In a machine of the character described, a turret, a series of circumferentially spaced rotatable work holders on the turret, a rotatable cutter associated with each work holder, a shaft at the axis of the turret, means for rotating the turret, means for driving said shaft, a series of radially disposed shafts carried by the turret, means for driving said radial shafts from the axial shaft, means for driving a work holder and the cutter associated therewith from each of said radial shafts, means for automatically causing a relative feed movement between the work holder and cutter during rotation of the turret, and clutches controlling the operation of the cutters and work holders.

10. In a machine of the character described, a fixed base member, a rotary turret, a plurality of vertical guideways carried by the turret, a head slidably mounted in each guideway, a rotary chuck carried by each head, a tail stock carried by each head and movable toward and from the chuck on said head, cutters carried by the turret, one adjacent each work holder frame and adapted to engage with a piece of work held between the chuck and tail stock, means for raising and lowering said heads during each rotation of the turret, means for rotating the turret and independently controlled means for driving each of the chucks and cutters.

11. A multiple hobbing machine comprising a rotary turret, a series of circumferentially spaced hobbing cutters mounted on the turret, a rotatably mounted work holder mounted on the turret adjacent each cutter, means for rotating the turret, means including a shaft extending through the turret for driving the cutters and work holders, and means operable during movement of the turret for feeding the work to the cutter and for freeing the work from the cutter.

12. A multiple hobbing machine comprising a rotary turret, a series of circumferentially spaced hobbing cutters mounted on the turret, a rotatably mounted work holder mounted on the turret adjacent each cutter, means for rotating the turret, means including a shaft extending through the turret and other shafts driven thereby for driving the cutters and work holders, and means operating automatically during rotation of the turret for shifting the work holders to bring the work into engagement with the cutters, to feed the work to the cutters and to disengage the work from the cutters.

13. In a machine of the character described, a milling machine comprising a rotatable cutter and a rotatable work holder, said cutter and work holder being relatively movable bodily one with respect to the other, means for moving said machine in an endless path, means operable during a portion of the movement of said milling machine for maintaining the cutter and work holder in relative positions such that the work is out of engagement with the cutter and during another portion of the movement to move the work holder relatively with respect to the cutter to engage the cutter with the work and progressively feed the work to the cutter, and clutch controlled means for driving the cutter and work holder.

14. A multiple spindle hobbing machine comprising a rotatable turret, a plurality of hobbing cutters mounted on the turret, a rotatable work holder adjacent each cutter, means for driving the turret, cutters and work holders, manually operable means for controlling the operation of the cutters and work holders, and means for imparting a complete feed movement of the work holders with respect to the cutters during each rotation of the turret.

15. A multiple spindle hobbing machine comprising a rotatable turret, a plurality of hobbing machines mounted on the turret and each comprising a hobbing cutter and a blank holder having means for releasably holding a blank, means for driving the hobbing cutters and blank holders, means for imparting a complete feed movement to each hobbing machine during a revolution of the turret to hob a blank and for freeing the blank from the cutter at one point in the travel of the machine to permit removal and insertion of the blanks, and clutches by which the rotation of the cutter and blank holder of each of said hobbing mechanisms may be controlled independently of the others.

16. A multiple hobbing machine, comprising a fixed base member, a turret rotatably mounted on said base member, a series of angularly spaced cutter heads fixed to but adjustable radially of the turret, each head having a spindle with a hobbing cutter thereon, a work holding head mounted for vertical movement on the turret adjacent each cutter head, each work holding head having a vertical work holding spindle, a cam track on the fixed base member upon which said work holding heads are mounted, said cam track having a low portion for supporting work holding heads in a position in which the work is below the cutter, the remainder of the track being of gradually increasing height in the direction of rotation of the turret and means for driving the turret and spindles.

17. A multiple spindle hobbing machine comprising a rotatable support, a series of circumferentially spaced hobbing cutters thereon, a rotatable blank holder adjacent each cutter and mounted for movement bodily on the support, a drive shaft, gearing interposed between said shaft and support for rotating the same, gearing and a shaft disposed at and extending lengthwise of the axis of the support interposed between the drive shaft and the cutters and blank holders for driving said cutters and blank holders, and a stationary cam with which the blank holders engage for moving said blank holders relatively with respect to the cutters.

18. A multiple spindle hobbing machine comprising a rotatable support, a series of circumferentially spaced hobbing cutters mounted for rotation about horizontal axes on said support, a work holder associated with each cutter and mounted for movement bodily in a vertical direction on said support, each work holder having a chuck rotatable about a vertical axis and a tail stock movable toward and from said chuck, means for rotating said support and for driving said cutters and chucks, a fixed cam track for raising and lowering said work holders during movement of said support, and means associated with each work holder for shifting the tail stock and for feeding a blank from said chuck.

19. In a machine of the character described, a rotary turret, means for rotating the turret, a plurality of rotatable cutters on the turret, a work holder mounted on the turret adjacent each cutter, means for adjusting each cutter toward or from the axis of the turret, a drive shaft at the axis of the turret, means for driving the cutters from said drive shaft, and means acting automatically during rotation of the turret for causing a relative feed movement between the cutter and work holder.

20. In a machine of the character described, a rotary turret, means for rotating the turret, a plurality of rotatable cutters on the turret, each adjustable toward or from the axis of the turret and angularly about an axis extending transversely with respect to the axis of the turret, a work holder mounted on the turret adjacent each cutter, a drive shaft at the axis of the turret, means for driving the cutters from said drive shaft, and means acting automatically during rotation of the turret for causing a relative feed movement between the cutter and work holder.

21. A multiple spindle hobbing machine comprising a turret having a plurality of hobbing mechanisms thereon each including a hob head and a work head each having a spindle, and mechanism for rotating the said spindles including a shaft driven from the lower end extending centrally through the turret and driving connections for each unit extending from the upper end of said shaft to each of said spindles.

22. In a multiple spindle machine tool, a rotary turret having a plurality of machine units each including a tool spindle and a work spindle, means for moving one relative to the other for feeding purposes as the turret is rotated, and means for rotating the spindles of the different units comprising a shaft at the axis of rotation of the turret and a plurality of shafts rotated thereby and one provided for each unit, the same being provided with driving connections with the two spindles thereof.

23. In a multiple spindle machine tool, a rotary turret having a plurality of machine units thereon each including a tool head and a work head with a work spindle, means for causing relative movement between the tool heads and work heads, and an operating mechanism for the units comprising a shaft extending lengthwise of the turret, and a plurality of shafts radial thereto and adapted to be driven thereby, one being provided for each unit and having a driving connection with the work supporting member of the corresponding work head.

24. In a multiple spindle machine tool, a rotary turret, a plurality of units mounted thereon and each comprising a tool spindle and a work spindle, both adapted to be rotated, means for causing relative movement between the spindles for feeding purposes as the turret is rotated, and operating mechanism for the units comprising a shaft extending centrally through the turret, a plurality of shafts radial thereto and adapted to be driven thereby, one of said radial shafts being provided for each unit and each having driving connections with the tool and work spindles thereof.

25. In a multiple spindle machine tool, a rotary turret having a plurality of separate working units mounted thereon each including a tool head and a work head, one head of each unit being slidably mounted on the turret to impart feeding movement to the work and provided with a portion spaced from said slidable mounting extending lengthwise of the turret, and a guide for said portion to steady it.

26. In a multiple spindle machine tool, a rotary turret having a plurality of working mechanisms mounted thereon each including a tool head and a work head, the lower part of the work head having sliding connection with the turret to move lengthwise thereof and provided with a portion extending lengthwise of the turret, and a connection between said portion and the turret to steady the same.

27. In a multiple spindle machine tool, a rotary turret adapted to be rotated about a vertical axis, a plurality of mechanisms mounted thereon each including a tool head and a work head, the work head having sliding connection with the turret to move vertically for feeding purposes, each work head having an arm extending upwardly along the turret and adapted to assist in supporting the work, and a guiding connection between the arm and the turret.

28. In a multiple spindle machine tool, a rotary turret adapted to be rotated about a vertical axis, a plurality of mechanisms mounted thereon each including a tool head and a work head, the work head having sliding connection with the turret to move vertically for feeding purposes, each work head having a portion extending upwardly along the turret and adapted to assist in supporting the work, and means at the top of the turret for guiding said portions of the different work heads.

29. In a multiple spindle machine tool, a rotary turret having a plurality of mechanisms thereon each including a tool head and a work head and having also a plurality of guideways for said heads, one head being slidable along a guideway extending lengthwise of the turret and the other being slidable along a guideway extending crosswise of the turret.

30. In a multiple spindle machine tool, a turret adapted to rotate about a vertical axis and provided with a plurality of mechanisms each including a tool head and a work head, each head comprising a body with a rotatable driven member, one head being slidable vertically lengthwise of the turret and the other head being slidable transversely of the turret adjacent the top thereof.

31. In a multiple spindle machine tool, a turret having vertically disposed guideways at its periphery and radially disposed guideways adjacent the top thereof, a plurality of mechanisms each having a tool holder and a work holder engaging two of said guideways.

32. In a multiple spindle machine tool, a turret rotatable about a vertical axis and provided with a plurality of mechanisms each including a tool head and a work head, the work head being movable vertically at the periphery of the turret and engaging a pair of vertically disposed guideways on the turret, and a driving shaft located between said guideways and having an operative driving connection with the work supporting member of the work head.

33. In a multiple spindle machine tool, a turret adapted to rotate about a vertical axis, a plurality of mechanisms mounted thereon each comprising a tool head and a work head with a work spindle, a plurality of guideways for the work heads each including two spaced vertically disposed guide portions, mechanism for rotating the work spindles including a plurality of radially disposed shafts and vertically disposed shafts connected to the work spindles and located between the vertically disposed guide portions of the different guideways.

34. A multiple spindle machine tool, comprising a turret with a plurality of mechanisms mounted thereon each comprising a tool head and a work head at least one of which has a spindle adapted to be rotated, means for rotating said spindle and for rotating the turret, one of the heads being movably mounted on the turret for feeding purposes and opposite ends thereof having sliding connections with the turret at spaced points thereof.

35. A multiple spindle machine tool comprising a turret with a plurality of mechanisms mounted thereon, each comprising a tool head and a work head both having spindles adapted to be rotated, means for rotating said spindles and for rotating the turret, the work head of each mechanism being slidably mounted on the turret for feeding purposes and having at opposite ends sliding connections with the turret.

36. A multiple spindle hobbing machine, comprising a turret having a plurality of hobbing mechanisms thereon, each including a hob head and a work head, each of said hob heads being adjustable toward and away from the work, a driving shaft arranged centrally in said turret, and hob driving mechanisms operatively connected with said shaft and with the hobs comprising extensible means to compensate for said hob head adjustments.

37. In a multiple spindle machine tool, a turret adapted to be rotated about a vertical axis, a plurality of mechanisms mounted thereon, each including a tool head and a work head, the work head having supporting connections with said turret adjacent both ends of the work, and means for moving one of said heads for feeding purposes as the turret revolves about its axis.

38. In a machine tool, a rotary turret, a drive shaft centrally located therein, a radially extending shaft geared to said drive shaft, a third shaft parallel to said drive shaft geared to said radial shaft, a work support and a tool support, each having a rotatable element, one of said supports being mounted to slide parallel with said third shaft and its rotatable element having a slidable driving connection with said third shaft, and means connected with said radial shaft for driving the rotatable element of the other support.

39. In a machine tool, a rotary turret, a drive shaft centrally located therein, a radially extending shaft geared to said drive shaft, a third shaft parallel to said drive shaft geared to said radial shaft, a work support and a tool support, each having a rotatable element, one of said supports being mounted to slide parallel with said third shaft and its rotatable element having a slidable driving connection with said third shaft, the other of said supports being movable in a direction parallel with said radial shaft and carrying driving mechanism connected with said radial shaft.

40. In a machine tool, a tail stock comprising a body having a work engaging member, a guide therefor, means for moving said tail stock upon said guide, a clamp for locking said tail stock body to said guide, and a handle movable in one plane to operate said tail stock moving means and movable in another plane to operate said clamp.

41. In a machine tool, a tail stock comprising a body having a work engaging member, a guide therefor, a rack and pinion connection between said tail stock body and guide, a handle for rotating said pinion, and a clamp for locking said tail stock body to said guide, said clamp being operable by the movement of said handle in a direction toward parallelism with the axis of said pinion.

In testimony whereof, we hereunto affix our signatures.

LUTHER A. SOMMER.
FRANK H. ADAMS.